United States Patent
David et al.

(10) Patent No.: US 11,619,347 B2
(45) Date of Patent: Apr. 4, 2023

(54) LUBRICANT FITTING UNIT WITH INTEGRATED LUBRICANT FLOWMETER

(71) Applicant: AKTIEBOLAGET SKF, Gothenburg (SE)

(72) Inventors: Sebastien David, Ouderkerk aan de Amstel (NL); Paola Jimenez, Usselstein (NL); Guus Willems, Utrecht (NL)

(73) Assignee: AKTIEBOLAGET SKF, Gothenburg (SE)

( * ) Notice: Subject to any disclaimer, the term of this patent is extended or adjusted under 35 U.S.C. 154(b) by 154 days.

(21) Appl. No.: 17/099,836

(22) Filed: Nov. 17, 2020

(65) Prior Publication Data
US 2021/0190265 A1    Jun. 24, 2021

(30) Foreign Application Priority Data
Dec. 18, 2019   (DE) .................... 10 2019 219 996.8

(51) Int. Cl.
*F16N 11/08*   (2006.01)

(52) U.S. Cl.
CPC .......... *F16N 11/08* (2013.01); *F16N 2250/08* (2013.01)

(58) Field of Classification Search
CPC ...................................... F16N 11/08
USPC .................................. 184/6, 105.3
See application file for complete search history.

(56) References Cited

U.S. PATENT DOCUMENTS

| | | | | |
|---|---|---|---|---|
| 6,236,328 B1* | 5/2001 | Smith | ............... | F16C 19/525 340/682 |
| 6,271,761 B1* | 8/2001 | Smith | ............... | F16C 33/6622 340/682 |
| 7,034,711 B2* | 4/2006 | Sakatani | ............... | G01H 1/003 340/682 |
| 7,394,395 B2* | 7/2008 | Sakatani | ............... | G01V 1/223 384/91 |
| 9,291,203 B2* | 3/2016 | Lewis | ............... | F16C 17/243 |
| 9,841,141 B2* | 12/2017 | Conley | ............... | F16C 33/76 |

(Continued)

FOREIGN PATENT DOCUMENTS

| CN | 202114898 U | 1/2012 |
|---|---|---|
| GB | 2536916 A | 10/2016 |

*Primary Examiner* — Michael R Mansen
*Assistant Examiner* — Mark K Buse
(74) *Attorney, Agent, or Firm* — J-TEK Law PLLC; Scott T. Wakeman; Mark A. Ussai

(57) ABSTRACT

A lubricant fitting unit is for supplying lubricant to an item of equipment and includes a housing connectable with the item of equipment and providing a lubricant flow path fluidly coupleable with the item of equipment. A lubricant flowmeter is connected to the lubricant flow path and measures lubricant flow through the flow path. The fitting unit preferably includes an integrated condition monitoring system coupled to the housing, which preferably includes a temperature sensor and/or a vibration sensor. Further, the fitting unit also preferably includes a wireless data transmission device for transmitting signals received from the integrated condition monitoring system to a controller device. Also, the fitting unit may include an energy harvester mounted within the lubricant flow path for converting a portion of the kinematic energy of the lubricant flowing through the lubricant flow path into power for recharging a power unit of the monitoring device.

18 Claims, 1 Drawing Sheet

(56) References Cited

U.S. PATENT DOCUMENTS

| | | | |
|---|---|---|---|
| 2014/0109663 A1* | 4/2014 | Dennison | G01F 1/684 |
| | | | 73/204.11 |
| 2014/0260668 A1* | 9/2014 | Liu | G01F 1/662 |
| | | | 73/861.28 |
| 2019/0040998 A1* | 2/2019 | Wride | F16N 29/04 |
| 2019/0310116 A1* | 10/2019 | Pilegaard | G01F 1/662 |

* cited by examiner

LUBRICANT FITTING UNIT WITH INTEGRATED LUBRICANT FLOWMETER

CROSS-REFERENCE

This application claims priority to German Patent Application No. DE 10 2019 219 996.8, filed Dec. 18, 2019, the entire contents of which are fully incorporated herein by reference.

BACKGROUND OF THE INVENTION

The present invention relates to lubrication, and more particularly to lubrication systems for supplying equipment with lubricant.

Equipment such as a bearing, such as for example, a rolling bearing, a bushing bearing, a plain bearing, or other types of equipment, typically require lubrication to maintain proper functioning.

Industrial facilities may include a large number of items of equipment or machines which all require lubrication. It is thus particularly complicated or complex to separately verify that each item of a large number of equipment or machines is correctly supplied with lubricant.

Furthermore, the monitoring of certain conditions, such as temperature or vibration, of such equipment may be used to control and/or improve the service life of such equipment.

However, each item of equipment is often monitored by a plurality of separate condition monitoring devices, which may lead to a large number of different monitoring components that need to be assembled onto or within the equipment.

SUMMARY OF THE INVENTION

An important goal of the present invention is to provide a lubricant fitting for various equipment which ensures that the lubricant correctly flows into and/or through such equipment.

According to an embodiment of the invention, a lubricant fitting unit is configured to supply lubricant, such as for example grease, to equipment to be lubricated. The unit comprises a lubricant flow path and a lubricant flowmeter connected to the lubricant flow path in order to ensure that lubricant is flowing into the equipment.

The lubricant fitting unit of the invention is capable of measuring and controlling the flow of lubricant into the equipment.

Preferably, the lubricant fitting unit is easy to design and/or produce and to assemble onto the equipment.

Also, the lubricant fitting unit preferably further comprises an integrated condition monitoring system. Such an integrated condition monitoring system may include, for example, at least a temperature sensor and/or a vibration sensor. Additionally, the lubricant fitting unit may also comprise an ultrasonic sensor.

All of such sensors are preferably integrated inside the lubricant fitting unit. With the lubricant fitting unit of the present invention, conditions of the equipment may be readily monitored without requiring the use of a plurality of other sensors fixed on the equipment. In other words, the sensors provided within the lubricant fitting unit reduces or eliminates the need to provide other, separate monitoring sensors for the equipment.

Preferably, the lubricant fitting unit also further comprises a wireless data transmission device configured to transmit signals received from the integrated condition monitoring system to a controller device. Such a controller device is preferably configured to determine the amount of lubricant required and to calculate and/or record the intervals between lubrication operations. Further, the controller device may be connected to an external server or computer, such as a cloud database for processing and storing the information received.

Preferably, the lubricant fitting unit also further comprises an energy harvester mounted on or within the lubricant flow path and configured to convert a portion of the kinematic energy of the lubricant flowing in the lubricant flow path into power for recharging a power unit.

Preferably, the lubricant fitting unit further comprises a housing delimited by a connecting end portion and a receiving end portion, opposite to the connecting end portion, the lubricant flow path extending from the receiving end portion to the connecting end portion. The connecting end portion is preferably provided with outer threads configured to cooperate or mate with threads provided on the equipment, but may include any other type of fluid connective structure, such as for example, a quick connect stem, etc. Further, the receiving end portion may be configured to receive a lubricant line, such as a hose, pipe, tube, etc., for supplying lubricant into the equipment through the lubricant fitting unit.

According to another embodiment, the present invention is also directed to an assembly comprising an item of equipment to be lubricated and a lubricant fitting unit as described above, which is configured to supply lubricant, such as for example grease, to the equipment item.

For example, the item of equipment may be a bearing unit including a bearing housing and a bearing. The bearing may be a rolling element bearing, a plain bearing, a bushing or any other type of bearing. However, the equipment to be lubricated may be any other component needing lubricant, such as for example, a gear, cutting tool, piston, cam, etc.

BRIEF DESCRIPTION OF THE SEVERAL VIEWS OF THE DRAWING

The present invention and its advantages will be better understood by studying the detailed description of a specific embodiment given by way of a non-limiting example and illustrated by the appended drawings, in which.

DETAILED DESCRIPTION OF THE INVENTION

Figure 1:
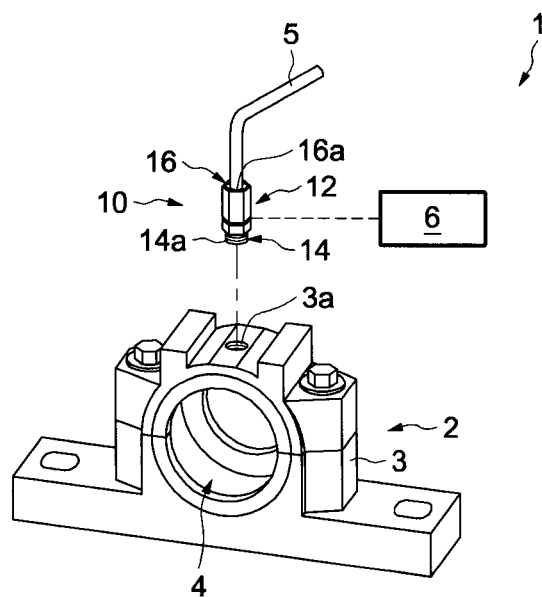
FIG. 1 is a perspective view of an assembly comprising a lubricant fitting unit according to an embodiment of the invention, and equipment to be lubricated.

The assembly 1 depicted in FIG. 1 comprises a lubricant fitting unit 10 configured to supply lubricant, such as for example grease, to an item of equipment 2 requiring lubrication (e.g., a machine, machine component, tool, etc.). As shown, the item of equipment 2 may be a bearing unit comprising a bearing housing 3 and a bearing 4. The bearing 4 may be a rolling element bearing, a plain bearing, a bushing or any other type of bearing. The equipment item 2 may be any other component requiring lubrication, such as for example, a gear or gear train, a cam, a piston, a cutting tool, etc.

The lubricant fitting unit 10 comprises a housing 12 connectable with the equipment 2 and delimited by a connecting end portion 14 and a receiving end portion 16, opposite to the connecting end portion 14. The connecting end portion 14 is preferably provided with outer threads 14a configured to cooperate with inner threads 3a provided on the bearing housing 3 so as to connect the fitting unit 10 with the equipment 2. Further, the receiving end portion 16 is configured to receive a lubricant line 5, such as a pipe, hose, tube, etc., for supplying lubricant into the equipment 2 through the lubricant fitting unit 10.

The housing 12 of the lubricant fitting unit 10 is provided with a longitudinal through hole 16a extending through the entire length of the housing 12 from the receiving end portion 16 to the connecting end portion 14. The through hole 16a acts as or provides a lubricant flow path 12a fluidly connectable with the equipment 2, preferably with the bearing 4. As depicted, the connecting end portion 14 is opposite to the receiving end portion 16 on the housing 12. Alternatively, the connecting end portion 14 may be provided on one side of the housing 12 and the receiving portion 16 on another side adjacent to the one side providing the connecting portion 14, such as when the flow path 12a extends in a curved path through the housing 12.

Figure 2:
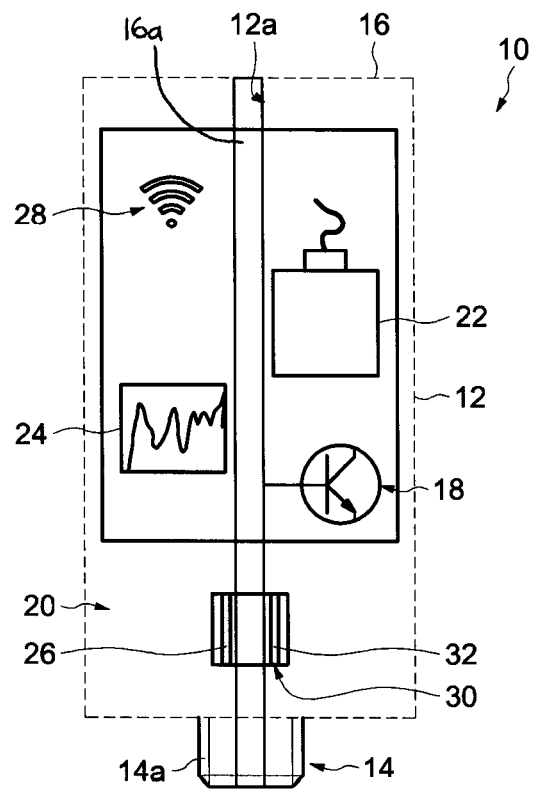
FIG. 2 is a schematic view of the lubricant fitting unit of FIG. 1.

As shown in FIG. 2, the lubricant fitting unit 10 preferably further comprises a lubricant flowmeter 18 fluidly connected to the lubricant flow path 12a. The flowmeter 18 is provided to ensure that lubricant is flowing into the equipment 2, and preferably to verify that lubricant flows through the flow path 12a at a desired rate, and is preferably configured to measure flow through the flow path 12a.

Preferably, the lubricant fitting unit 10 further comprises an integrated condition monitoring system 20 including a temperature sensor 22, a vibration sensor 24 and/or an ultrasonic sensor 26. Each of the sensors 22, 24, 26 is preferably integrated onto or within the housing 12 of the lubricant fitting unit 10. Such sensors 22, 24, 26 provide data on the functioning or operation of the equipment 2 or/and the fitting unit 10.

The lubricant fitting unit 10 preferably further comprises a wireless data transmission device 28 configured to transmit signals received from the sensors 22, 24, 26 to a controller device 6. The controller device 6 is preferably configured to determine the amount of lubricant required by the equipment 2 and/or flowing through the fitting unit 10, as well as recording and/or calculating the intervals between each lubrication operation (i.e., the dispensing of lubricant into the equipment 2). The controller device 6 may be connected to an external server or computer, such as a cloud server (not shown) for processing and storing the information received from the fitting unit 10.

The lubricant fitting unit 10 preferably further comprises an energy harvester 30, which includes the ultrasonic sensor 26 and a power unit 32, such as for example a battery, for providing power to the sensors 22, 24, 26 and the wireless data transmission device 28. The energy harvester 30 is a kinematic converter preferably functioning as a micro turbine mounted at an end of the lubricant flow path 12a and configured to convert a portion of the kinematic energy of the lubricant passing through the ultrasonic sensor 26 into power to recharge the battery 32 (i.e., with the converted energy from the lubricant).

The lubricant fitting unit 10 of the present invention enables the measurement and control of the flow of lubricant into the item of equipment 2. Also, with the lubricant fitting unit 10 of the present invention, conditions of the equipment 2 may be readily monitored without the need for separate additional sensors provided on the equipment 2.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A lubricant fitting unit for supplying lubricant to an item of equipment, the fitting comprising:
   a lubricant flow path;
   a lubricant flowmeter connected to the lubricant flow path; and
   an energy harvester mounted in the lubricant flow path and configured to convert a portion of the kinematic energy of the lubricant flowing through the lubricant flow path into power for recharging a power unit.

2. The lubricant fitting unit according to claim 1, further comprising an integrated condition monitoring system.

3. The lubricant fitting unit according to claim 2, wherein the integrated condition monitoring system includes at least one of a temperature sensor and a vibration sensor.

4. The lubricant fitting unit according to claim 2, further comprising a wireless data transmission device configured to transmit signals received from the integrated condition monitoring system to a controller device.

5. The lubricant fitting unit according to claim 1, wherein the energy harvester includes an ultrasonic sensor.

6. The lubricant fitting unit according to claim 1, further comprising a housing delimited by a connecting end portion and a receiving end portion, the lubricant flow path extending between the receiving end portion and the connecting end portion.

7. The lubricant fitting unit according to claim 6, wherein the connecting end portion is provided with outer threads configured to engage with inner threads provided on the equipment.

8. The lubricant fitting unit according to claim 1, further including at least one of a temperature sensor and a vibration sensor, each sensor being separate from the energy harvester, the power unit including a battery connected with the at least one of the temperature sensor and the vibration sensor.

9. The lubricant fitting unit according to claim 1, wherein the energy harvester includes a microturbine mounted in the lubricant flow path and configured to convert a portion of the kinematic energy of lubricant passing through the microturbine into electric power for recharging the power unit.

10. An assembly comprising:
an item of equipment;
a lubricant fitting unit connected with the equipment and including a lubricant flow path and a lubricant flowmeter connected to the lubricant flow path;
at least one of a temperature sensor and a vibration sensor for providing data on the functioning or operation of at least one of the equipment and the fitting;
a power unit for providing power to the at least one of the temperature sensor and the vibration sensor; and
an energy harvester mounted in the lubricant flow path and configured to convert a portion of the kinematic energy of the lubricant flowing through the lubricant flow path into power for recharging the power unit.

11. The assembly according to claim 10, wherein the fitting includes a housing delimited by a connecting end portion and a receiving end portion, the lubricant flow path extending between the receiving end portion and the connecting end portion, the receiving end portion being configured to receive a lubricant supply line for supplying lubricant to the equipment through the lubricant fitting unit.

12. A lubricant fitting unit for supplying lubricant to an item of equipment, the fitting comprising:
a housing connectable with the item of equipment and providing a lubricant flow path fluidly coupleable with the item of equipment; and
a lubricant flowmeter connected to the lubricant flow path and configured to measure lubricant flow through the flow path; and
an energy harvester including a microturbine mounted in the lubricant flow path and configured to convert a portion of the kinematic energy of the lubricant flowing through the microturbine into power for recharging a power unit.

13. The lubricant fitting unit according to claim 12, further comprising an integrated condition monitoring system coupled to the housing.

14. The lubricant fitting unit according to claim 13, wherein the integrated condition monitoring system includes at least one of a temperature sensor and a vibration sensor.

15. The lubricant fitting unit according to claim 13, further comprising a wireless data transmission device configured to transmit signals received from the integrated condition monitoring system to a controller device.

16. The lubricant fitting unit according to claim 12, wherein the energy harvester includes an ultrasonic sensor.

17. The lubricant fitting unit according to claim 12, wherein the housing has a connecting end portion and a receiving end portion, the lubricant flow path extending between the receiving end portion and the connecting end portion.

18. The lubricant fitting unit according to claim 17, wherein the connecting end portion is provided with outer threads configured to engage with inner threads provided on the equipment and the receiving end portion is configured to connect with a lubricant supply line.

* * * * *